July 21, 1953  E. P. KELLIE  2,645,884
PRESSURE REGULATING VALVE
Filed Dec. 1, 1949  2 Sheets—Sheet 1

INVENTOR.
Edward P. Kellie
BY
Barnes, Kisselle, Laughlin & Raisch
Attorneys.

Patented July 21, 1953

2,645,884

UNITED STATES PATENT OFFICE 2,645,884

PRESSURE REGULATING VALVE

Edward P. Kellie, Detroit, Mich.

Application December 1, 1949, Serial No. 130,381

15 Claims. (Cl. 50—10)

This invention relates to a pressure regulating valve and more particularly to a pressure regulating valve which is useful in a refrigeration system to prevent overloading of the electric motor-compressor unit.

The invention contemplates a pressure regulating valve which can be assembled in the suction line between the evaporator and the inlet port of the compressor to regulate the pressure of the gas at the inlet port of the compressor to prevent overloading of the motor-compressor unit.

In the operation of a mechanical refrigeration unit there are times at which the evaporator will be overloaded due to a severe temperature rise in the compartment being refrigerated. Such temperature rise will cause an abrupt rise in the refrigerant pressure in the evaporator and suction line, that is, in the so-called low side of the refrigerating system. Such rise in pressure in the suction line frequently causes an overload on the motor-compressor unit which causes the motor to burn out. With my pressure regulating valve in the suction line any such abrupt rise of refrigerant pressure in the suction line will cause the valve to move toward closed position and throttle the flow of gas through the suction line and thereby reduce the pressure of the refrigerant at the inlet of the compressor so that the compressor will operate within a safe load limit and any danger of the compressor being overloaded is obviated. My pressure regulating valve likewise operates to prevent overloading of the compressor in the event that liquid refrigerant should flow from the evaporator through the suction line toward the inlet of the compressor.

My invention contemplates a pressure regulating valve which is of simple structure, inexpensive to produce, and efficient and reliable in operation.

Figures 1, 2:
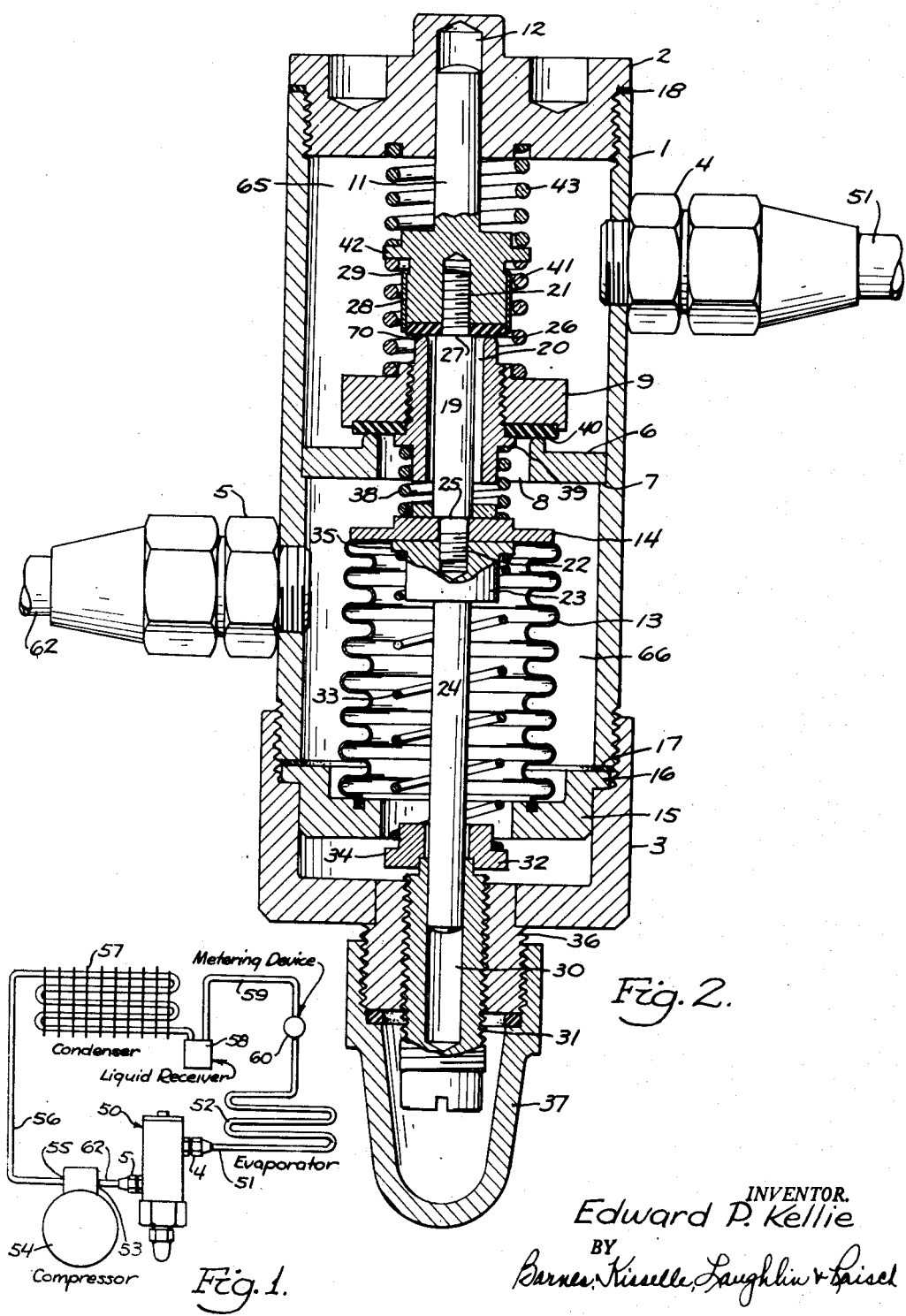
Fig. 1 is a schematic showing of my valve assembled in a mechanical refrigerating system.
Fig. 2 is a section through my valve assembly showing the valve closed.

Referring more particularly to the drawings, it will be seen that my valve assembly comprises the following parts: Hollow body 1, upper cap 2 having a screw fit with the upper end of body 1, lower cap 3 having a screw fit with the lower end of body 1, inlet port connection 4, outlet port connection 5, valve seat 6 fixed within body 1 on shoulder 7 and provided with a central opening 8, main valve 9, auxiliary bleeder valve 10 provided with a valve stem 11 slidably guided in central axial bore 12 of upper cap 2, flexible bellows 13 provided with an upper bellows plate 14 and a lower bellows plate 15 provided with an integral flange 16 which is clamped between lower cap 3 and the lower end of body 1. Sealing gaskets 17 and 18 are placed between the lower and upper caps and the respective ends of the body 1.

A push rod 19 extends through tubular insert 20 threaded into main valve 9. Push rod 19 has a substantial circumferential clearance with passageway 20 of the order of one-sixteenth ($\frac{1}{16}$) of an inch so that there is never any physical contact between rod 19 and passageway 20.

The upper reduced threaded end 21 of rod 19 is screwed into valve 10 and the lower reduced threaded end 22 of rod 19 is screwed into the head 23 of lower guide rod 24. Thus, the upper bellows plate 14 is clamped between head 23 and shouldered portion 25 of rod 19.

A sealing disk 26 of a flexible distortable material such as rubber, either natural or synthetic, but preferably the latter, is mounted upon the lower face of valve 10 and retained thereon by the upper shouldered portion 27 of rod 19 and by ferrule 28 which overlaps the peripheral edge of sealing disk 26 and has its upper edge spun over as at 29 to retain the same on valve 10.

Guide stem 24 is slidably guided in axial bore 30 of adjusting screw 31. A button 32 is fixed on the upper end of hollow screw 31. Compression coil spring 33 is mounted within bellows 13 and supported between shoulder 34 on button 32 and shoulder 35 on head 23. Compression spring 33 tends at all times to expand bellows 13. Adjusting screw 31 has a screw fit with insert 36 for the lower cap 3. A cover 37 has a screw fit on insert 36. A compression coil spring 38 is mounted between upper plate 14 of the bellows 13 and the flange 39 of main valve insert 20. A sealing disk 40 of any suitable flexible distortable sealing material such as rubber, either natural or synthetic, and preferably synthetic, is retained in place between flange 39 and the lower face of valve 9. A compression coil spring 41 is mounted between the upper face of main valve 9 and flange 42 on auxiliary valve 10 and another compression coil spring 43 is mounted between flange 42 of valve 10 and the lower face of upper cap 2.

From the above it will be seen that guide rod 24, head 23, bellows upper plate 14, push rod 19, bleeder valve 10 and guide rod 11 are all fixed together and move up and down as a unit and coil spring 43 continuously urges this unit downwardly and coil spring 33 continuously urges this unit upwardly. The wall of bellows 13 preferably is made of inherently resilient spring metal but it can be made of a flexible fabric. When bellows 13 is assembled within housing 1, the pressure within bellows 13 and between lower bellows plate 15 and lower cap 3 is atmospheric.

In Fig. 1 I have shown my pressure regulating valve, which is generally designated 50, mounted in the suction line 51 of a conventional mechanical refrigeration system between evaporator 52 and the inlet 53 of compressor 54 which is driven by a conventional electric motor. The outlet port 55 of the compressor is connected by line 56 with condenser 57, the outlet of which is connected into liquid receiver 58. Line 59 connects the liquid receiver with a metering device 60 which can be any conventional metering device in the form of a restriction such as the well-known capillary tube restrictor, an expansion valve, or a high or low side float valve.

In mounting my pressure control valve 50 in a mechanical refrigeration system the inlet connection 4 is connected to line 51 leading from evaporator 52 and the outlet port connection 5 is connected to line 62 leading to the intake port 53 of the compressor. A refrigerant is compressed in compressor 54 which passes through line 56 to condenser 57 wherein it is liquefied. A liquid refrigerant flows from the condenser into liquid receiver 58 and then through line 59 and metering device 60 into evaporator 52. Metering device 60 divides the high pressure side of the system from the low pressure side. Since the pressure in the evaporator is lower than the pressure on the condenser side of metering device 60, the refrigerant in evaporator 52 evaporates thereby abstracting heat from the compartment being refrigerated.

After it is determined what the maximum safe low side or suction pressure at the compressor shall be in relation to the high side pressure, cap 37 is removed and adjusting screw 31 is turned to adjust the pressure at which valves 9 and 10 will open. Clockwise turning of screw 31 acts to tighten or compress springs 33 and 43 whereas counterclockwise turning of screw 31 decreases the pressure on springs 33 and 43. Valve seat 6 serves to divide body 1 into upper chamber 65 and lower chamber 66.

Figure 3:
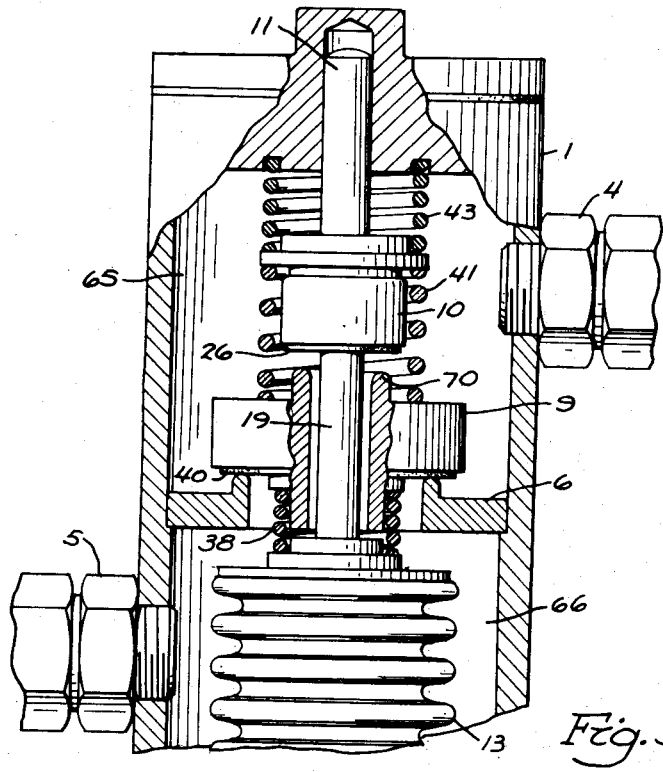
Fig. 3 is a fragmentary section showing my valve assembly with the auxiliary valve open so that the gaseous flow through the valve assembly is restricted.

If in the operation of the refrigerator a heavy heat load is placed upon evaporator 52 so that the gaseous pressure in line 51 rises above the predetermined maximum safe suction pressure, then pressure in chamber 65 will rise and if valve 9 is open (Fig. 4), the pressure in chamber 66 will also rise thereby tending to collapse bellows 13 and move valve 9 toward a closed position upon valve seat 6 to thereby close port 8. The pressure tending to collapse bellows 13 is opposed by coil spring 33 but is aided by spring 43. The tension on spring 33 is adjusted through screw 31 so that spring 43 and bellows 13 will react in response to any pressure above the predetermined maximum safe suction pressure at port 53, to close valve 9. Since the compressor 54 is operating, the pressure in chamber 66 will fall now that valve 9 is closed so that the air within the bellows 13, which has been somewhat compressed, will, due to the fall of gaseous pressure within chamber 66, tend to expand and aid spring 33 in opening or lifting valve 10 off its seat 70 (Fig. 3). Spring 33 and bellows 13 upon expanding, act through push rod 19 to lift valve 10 off its seat 70 and, in so doing, spring 38 is compressed and spring 41 is expanded. Valve 9 is floated about push rod 19 and in spaced relation therewith by the lower spring 38 and upper spring 41. Spring 41 and spring 38 are of substantially equal strength but the gaseous pressure obtaining in chamber 65 acts upon valve 9 to assist spring 41 in holding this valve closed.

Figure 4:
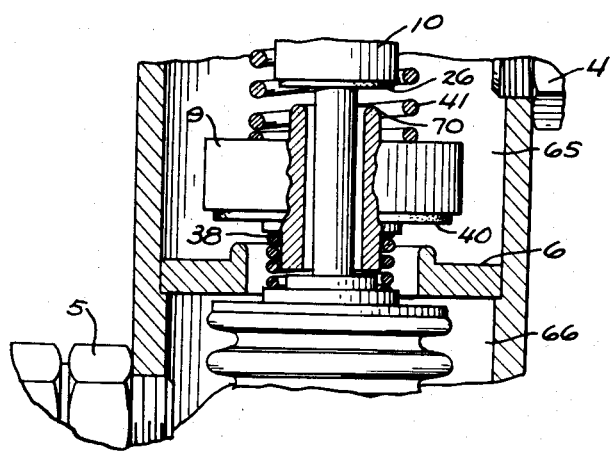
Fig. 4 shows my valve assembly with both the auxiliary and main valves open so that the flow through the valve assembly is substantially unrestricted.

Since bleeder valve 10 is open, gas will now bleed from chamber 65 through passageway 20 into chamber 66 and through outlet 5 to the intake port 53 of the compressor. If compressor 54 continues to withdraw gaseous refrigerant from chamber 66 faster than it is bled into this chamber from chamber 65, then valve 10 will open still further due to the reduction of pressure in chamber 66 until stem 11 abuts the top of bore 12 which acts as a limit to the upward or opening movement of valve 10. With valve 10 fully open bleeder orifice 20 is sized to suit the application and to handle or pass sufficient gas down to setting pressure to maintain said setting pressure at the compressor inlet. Therefore, pulldown will continue through bleeder orifice 20 until evaporator pressure approximates compressor suction pressure, then with pressures on both sides of valve 9 being practically equal, load on spring 38 which has increased slightly while load on spring 41 has decreased during the opening of the bleeder, causes main valve 9 to raise to the upper limit and present unrestricted opening to permit the compressor to pull down evaporator pressure as low as is required to obtain final cut-off temperature. This relation of the valves is shown in Fig. 4 wherein gas is flowing from chamber 65 through both passageway 20 and port 8 into chamber 66 and this condition of the valves 9 and 10 will obtain as long as the gaseous pressure in chamber 66 is at or below the maximum safe suction pressure at which it was predetermined to operate the compressor 54.

If liquid refrigerant should overflow from evaporator 52 through line 51 into chambers 65 and 66, this refrigerant will promptly evaporate and thereby cause a rise in pressure in chamber 66 which will act upon bellows 13 to contract the same and draw valves 9 and 10 down upon their seats to close off chamber 65 from chamber 66. Here, again, as the pressure in chamber 66 reaches the desired predetermined pressure, then bleeder valve 10 will open more or less, as above described, to maintain the predetermined pressure in chamber 66. Thus, in the operation of my pressure regulating valve if the pressure in chamber 66 falls slightly below the predetermined suction pressure, then bleeder valve 10 alone will open to admit more gas from chamber 65 into chamber 66 to bring the pressure up to the desired maximum safe suction pressure at the compressor. When pressure in chamber 66 exceeds predetermined maximum safe pressure, valve 10 is pulled downward by bellows 13 and valve 10 brings valve 9 down with it. Valves 9 and 10 close off ports 8 and 20 and pressure in chamber 66 then drops sharply and bellows 13 then lifts valve 10 until a balance is reached between outflow through port 5 and the inflow by valve 10 and through passageway 20 to maintain the desired maximum safe pressure in chamber 66 and compressor inlet.

This condition continues as long as evaporator pressure is above setting pressure. The higher pressure in chamber 65 exerts downward force on valve 9 to keep it closed. Valve 10 modulates to cause a varying pressure drop through orifice 20 so that as evaporator pressure is reduced and the density of the gas is correspondingly reduced more gas is permitted to pass to maintain setting pressure in chamber 66. This process continues until pressures in evaporator, chamber 65 and chamber 66 are equalized, then valve 9 springs wide open to permit unrestricted flow of gas from the evaporator to the compressor. Thus it will be seen that the modulating bleeder not only throttles to hold back excess pressures for protection of compressor unit but also maintains the highest possible constant density of the gas to permit maximum efficiency at the compressor.

As stated above, the suction pressure to be maintained in chamber 66 can be raised or lowered by adjustment of screw 31 to vary the tension or expansion force of spring 33.

I claim:

1. In a fluid pressure regulating valve of the type comprising a hollow body divided into first and second chambers, an inlet in the first chamber, an outlet in the second chamber, and a port between said chambers, means for controlling the flow of fluid from said inlet to said outlet comprising fluid pressure responsive means in the second chamber, a first valve for controlling the above said port, a second port in said first valve and smaller than said first mentioned port, a second valve for controlling said second port, a connection between said second valve and said fluid pressure responsive means whereby said second valve moves with said fluid pressure responsive mean as said means moves in response to changes in fluid pressure in said second chamber, and yieldable means for yieldably supporting and positioning said first valve between said fluid pressure responsive means and said second valve, said yieldable means acting between said second valve, said first valve, and said fluid pressure responsive means and urging said first valve toward closed position when said second valve is moved toward closed position and urging said first valve toward open position when the second valve is moved toward open position, whereby upon a rise in fluid pressure in said second chamber above a predetermined pressure said fluid pressure responsive means moves said second valve toward closed position and said second valve acts through said yieldable means to urge said first valve in a closing direction to thereby restrict fluid flow between the said chambers and whereby upon a fall in fluid pressure in said second chamber below said predetermined pressure said fluid pressure responsive means moves said second valve toward open position and acts through said yieldable means to urge said first valve in an opening direction.

2. The fluid pressure regulating valve defined in claim 1 wherein the connection between the fluid pressure responsive means and the second valve is a rigid connection.

3. The fluid pressure regulating valve defined in claim 2 wherein the rigid connection between the fluid pressure responsive means and the second valve passes freely through said port in said first mentioned valve.

4. The pressure regulating valve defined in claim 3 wherein said rigid connection takes the form of a rod having a smaller diameter than the port in said first mentioned valve whereby a clearance is provided between said rod and said port.

5. The pressure regulating valve defined in claim 4 wherein said yieldable means comprises a pair of coil springs positioned on opposite sides of said first valve and means on said first and second valves and fluid pressure responsive means for centering said springs and first valve axially with respect to the second valve and fluid pressure responsive means.

6. The fluid pressure regulating valve defined in claim 5 including axially aligned stems on said second valve and fluid pressure means and axially aligned guideways in the ends of said valve body in which said stems are slidably guided.

7. The fluid pressure regulating valve defined in claim 6 including resilient means acting upon said second valve and urging the same toward closed position.

8. The fluid pressure regulating valve defined in claim 7 including resilient means acting upon said fluid pressure responsive means in a direction in opposition to the resilient means acting upon the said second valve.

9. In a fluid pressure regulating valve of the type comprising a hollow body divided into first and second chambers, an inlet in the first chamber, an outlet in the second chamber, and a port between said chambers, means for controlling the flow of fluid from said inlet to said outlet comprising fluid pressure responsive means in the second chamber, a first valve for controlling the above said port, a second port in said first valve and smaller than said first mentioned port, a second valve for controlling said second port, said first valve being positioned between said second valve and said fluid pressure responsive means, a rigid connection between said second valve and said fluid pressure responsive means, said rigid connection passing through both the above-mentioned ports and having a substantial clearance with the said second port whereby said second valve and fluid pressure responsive means move as a unit, resilient means between said first and second valves, and a second resilient means between said first valve and said fluid pressure responsive means, said first and second resilient means supporting the first valve between said fluid pressure responsive means and said second valve whereby upon a rise in fluid pressure in said second chamber above a predetermined pressure said fluid pressure responsive means moves said second valve toward closed position and said second valve acts through said first resilient means to urge said first valve in a closing direction to thereby restrict fluid flow between the said chambers and whereby upon a fall in fluid pressure in said second chamber below said predetermined pressure said fluid pressure responsive means moves said second valve toward open position and acts through said second resilient means to urge said first valve in an opening direction.

10. The fluid pressure regulating valve defined in claim 9 wherein the first and second resilient means are the sole means for supporting the first-mentioned valve between said second valve and fluid pressure responsive means.

11. The fluid pressure regulating valve defined in claim 10 wherein said first and second resilient means are axially aligned.

12. The fluid pressure regulating means defined in claim 11 wherein the first and second resilient means each consists of a coil compression spring.

13. The fluid pressure regulating means defined in claim 12 wherein the said coil compression springs surround the rigid connection between the fluid pressure responsive means and the second valve.

14. The fluid pressure regulating valve defined in claim 13 including axially aligned stems on said second valve and fluid pressure means and axially aligned guideways in the ends of said valve body in which said stems are slidably guided.

15. In a fluid pressure regulating valve of the type comprising a hollow body divided into first and second chambers, an inlet in the first chamber, an outlet in the second chamber, and a port between said chambers, means for controlling the flow of fluid from said inlet to said outlet comprising a resilient bellows in said second chamber, a first valve for controlling the above said port, a second port in said first valve and smaller than said first mentioned port, a second valve for controlling said second port, said first valve being positioned between said second valve and said bellows, a connection between said second valve and said bellows whereby said second valve moves with said bellows as said bellows moves in response to changes in fluid pressure in said second chamber, and yieldable means for yieldably supporting said first valve in said position between said bellows and said second valve, said yieldable means acting upon said first valve and urging said first valve toward open and closed positions in response to movement of said second valve towards open and closed positions, respectively, whereby upon a rise in fluid pressure in said second chamber above a predetermined pressure said bellows moves said second valve toward closed position and said second valve acts through said yieldable means to urge said first valve in a closing direction to thereby restrict fluid flow between the said chambers and whereby upon a fall in fluid pressure in said second chamber below said predetermined pressure said bellows moves said second valve toward open position and acts through said yieldable means to urge said first valve in an opening direction.

EDWARD P. KELLIE.

References Cited in the file of this patent

UNITED STATES PATENTS

| Number | Name | Date |
|---|---|---|
| 1,953,603 | Hardy | Apr. 3, 1934 |
| 2,111,230 | Toussaint | Mar. 15, 1938 |
| 2,218,145 | Clayton | Oct. 15, 1940 |
| 2,237,215 | Coney | Apr. 1, 1941 |
| 2,351,190 | Carlson | June 13, 1944 |
| 2,365,650 | Shaw | Dec. 19, 1944 |
| 2,488,779 | Olson | Nov. 22, 1949 |
| 2,508,064 | Hazard | May 16, 1950 |

FOREIGN PATENTS

| Number | Country | Date |
|---|---|---|
| 52,141 | Denmark | of 1936 |